United States Patent [19]
Caron et al.

[11] Patent Number: 6,069,357
[45] Date of Patent: May 30, 2000

[54] DYNAMIC OPTICAL SCANNING CORRECTION DEVICE

[75] Inventors: Hubert Caron, Montreal, Canada; Zvika Afik, Tel Aviv; Uri Agam, Petach Tikvah, both of Israel

[73] Assignee: AlliedSignal Inc., Morris Township, N.J.

[21] Appl. No.: 08/914,671

[22] Filed: Aug. 19, 1997

Related U.S. Application Data

[60] Provisional application No. 60/026,624, Sep. 24, 1996.

[51] Int. Cl.[7] .............................. G02B 26/10; G01J 5/08
[52] U.S. Cl. ..................................... 250/334; 250/347
[58] Field of Search ........................ 250/334, 347, 250/348

[56] References Cited

U.S. PATENT DOCUMENTS

| | | | |
|---|---|---|---|
| 4,152,725 | 5/1979 | Beckman | 358/109 |
| 4,238,674 | 12/1980 | Kuerbitz et al. | 250/334 |
| 4,687,935 | 8/1987 | Loy | 250/334 |
| 4,763,001 | 8/1988 | Poxleitner et al. | 250/334 |
| 5,289,006 | 2/1994 | Gal | 250/334 |

*Primary Examiner*—Constantine Hannaher
*Assistant Examiner*—Albert Gagliardi
*Attorney, Agent, or Firm*—Oblon, Spivak, McClelland, Maier & Neustadt, P.C.

[57] ABSTRACT

A microscanner (30, 32, 34, 36) is cascaded with the electromechanical scanners (12, 14) in imaging systems to enhance their performance and correct inherent deficiencies in the scanning and/or the displayed imagery.

8 Claims, 6 Drawing Sheets

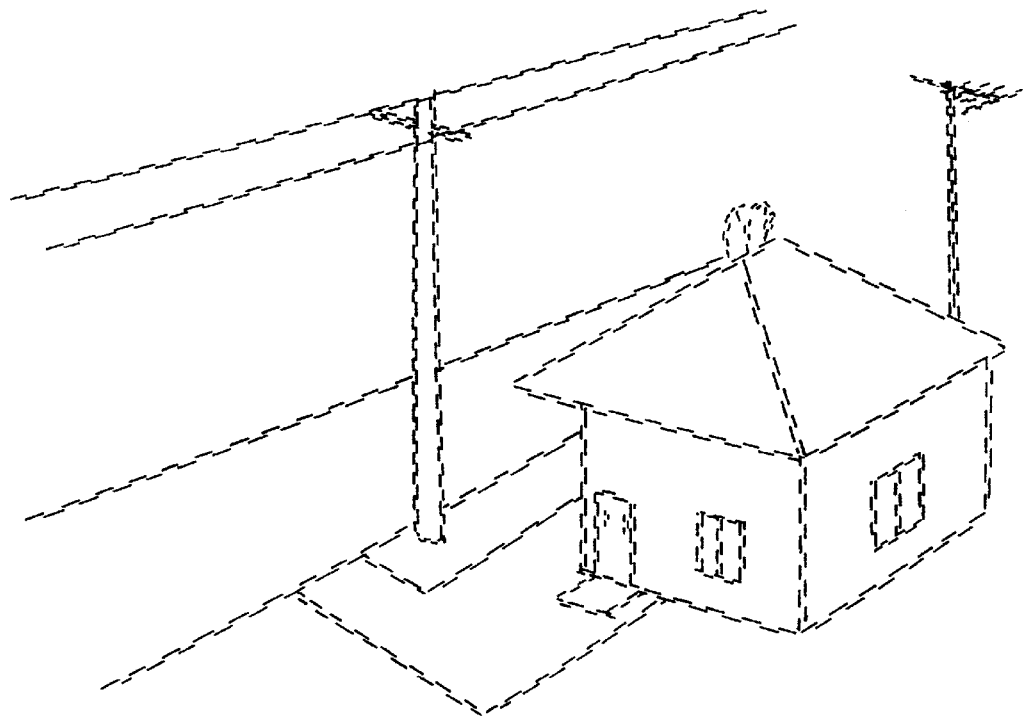
UNCORRECTED IMAGE
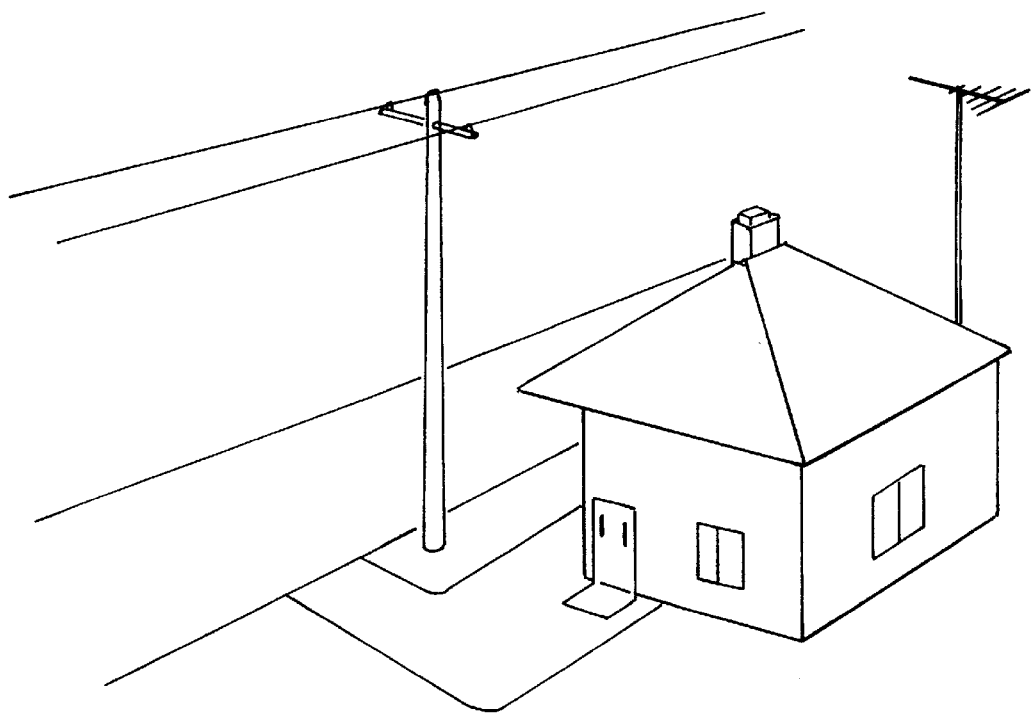
DESIRED CORRECTED IMAGE
FIG. 1

IDEAL SCAN PATTERN

ACTUAL SCAN PATTERN

DOUBLE INTERLACE SCAN PATTERN

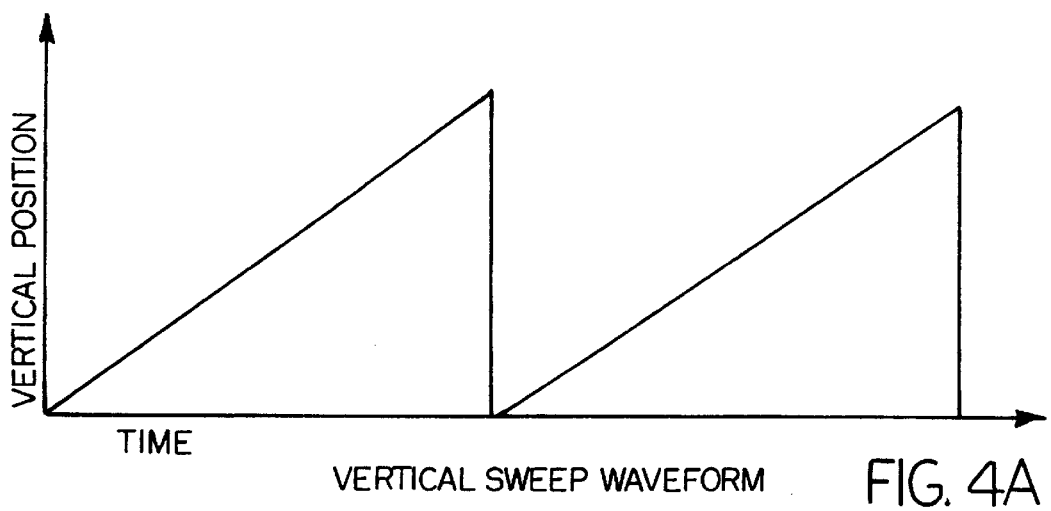
FIG. 4A VERTICAL SWEEP WAVEFORM
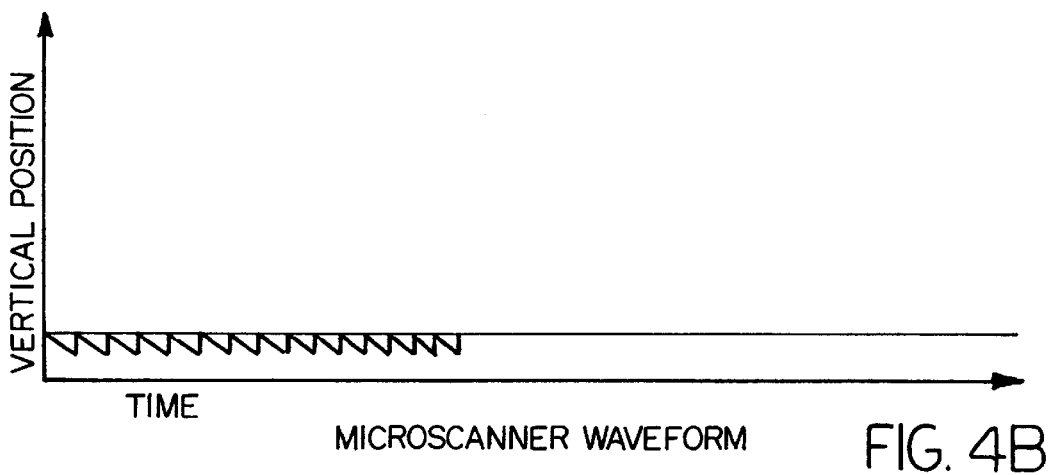
FIG. 4B MICROSCANNER WAVEFORM
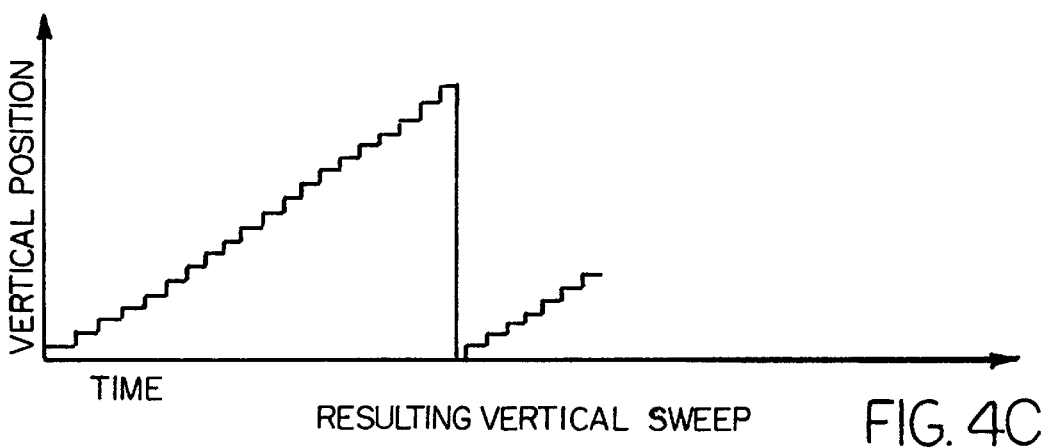
FIG. 4C RESULTING VERTICAL SWEEP

HORIZONTAL SINUSOIDAL SWEEP

MICROSCANNER SWEEP

LINEARIZED HORIZONTAL SCAN

DYNAMIC OPTICAL SCANNING CORRECTION DEVICE

This patent application claims priority upon U.S. Provisional patent application 60/026,624 filed Sep. 24, 1996.

The present invention relates to an optical scanning system having a microscanner cascaded with the electromechanical scanners in imaging systems to enhance their performance and correct inherent deficiencies in the scanning and/or the displayed imagery.

In certain types of imaging systems, the scenery is analyzed or scanned by an electromechanical scanner. In its simplest implementation, the scanner sweeps the field of view horizontally and vertically (raster scanning) and the scenery is analyzed one pixel at a time. The photon radiation coming from the pixel being analyzed is directed on a pixel size detector. The resulting signal is then processed electronically and fed to a pixel size light source (generally an LED) which is seen by the observer through the same scanner, thus reconstructing a full image of the scenery. When a bidirectional horizontal scanner is used to scan the sensed image and to sweep the display, the unavoidable delay introduced by the electronics, between the input and output photon signals, creates a shift between consecutively displayed lines. This is due to the fact that a given pixel being analyzed from left to right will be displayed to the observer as being shifted to the left of its theoretically correct position while a pixel displayed on the next line (scanned right to left) will be shifted to the right of its correct position. For example, a vertical straight line in the scenery will be displayed as a column of staggered pixels. This phenomenon can be referred to as picture tearing (see FIG. 1). For a variable speed scanner such as resonant or sinusoidal scanners, the amount of shift between lines will vary with the instantaneous scan velocity and therefore with the scan angle. It is highly desirable to correct such problems in bi-directonal horizontal scanner and variable speed scanner imaging systems.

The present invention corrects this problem by moving an optical element (a tilting mirror for example) in the display light path. This element is positioned by a fast responding actuator (typically piezoelectric) at an angular displacement which provides the necessary shift to the displayed signal to compensate exactly the shift introduced by the delay of the electronics. For a variable speed scanner, the correction changes with the scan angle. The tilting mirror and its actuator or controller constitute the microscanner. The present invention comprises a device for an electroptics imaging apparatus and which compensates for scanning nonlinearities and/or electronic delay, comprising a micropositioner, an optical element operated by the micropositioner, and means for utilizing scanner positional feedback signals of the apparatus to control operation of micropositioner, to provide an improved image for the electroptics imaging apparatus.

FIG. 1 is an illustration of an image having irregularities caused by scanning nonlinearities and/or electronics delay, and an image corrected by the present invention;

Figure 3A:
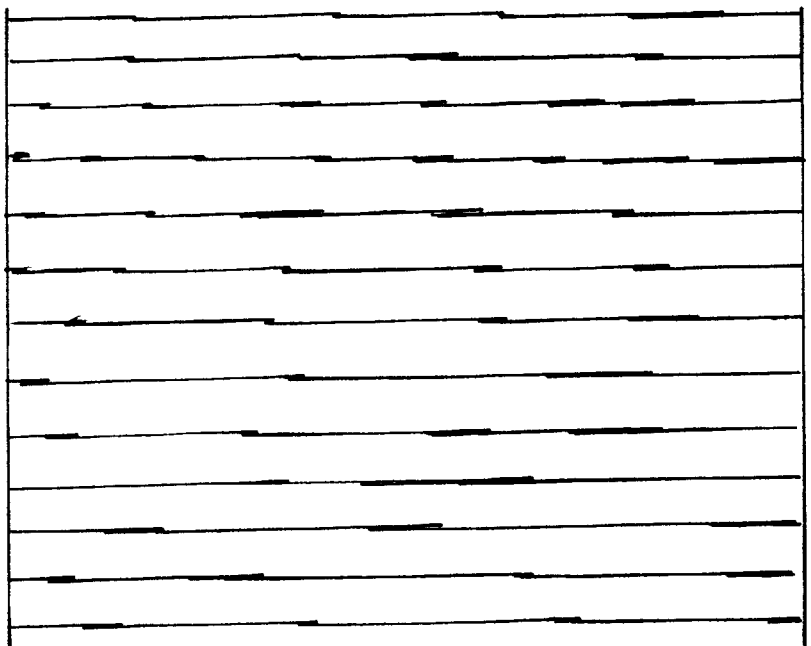
Figure 3B:
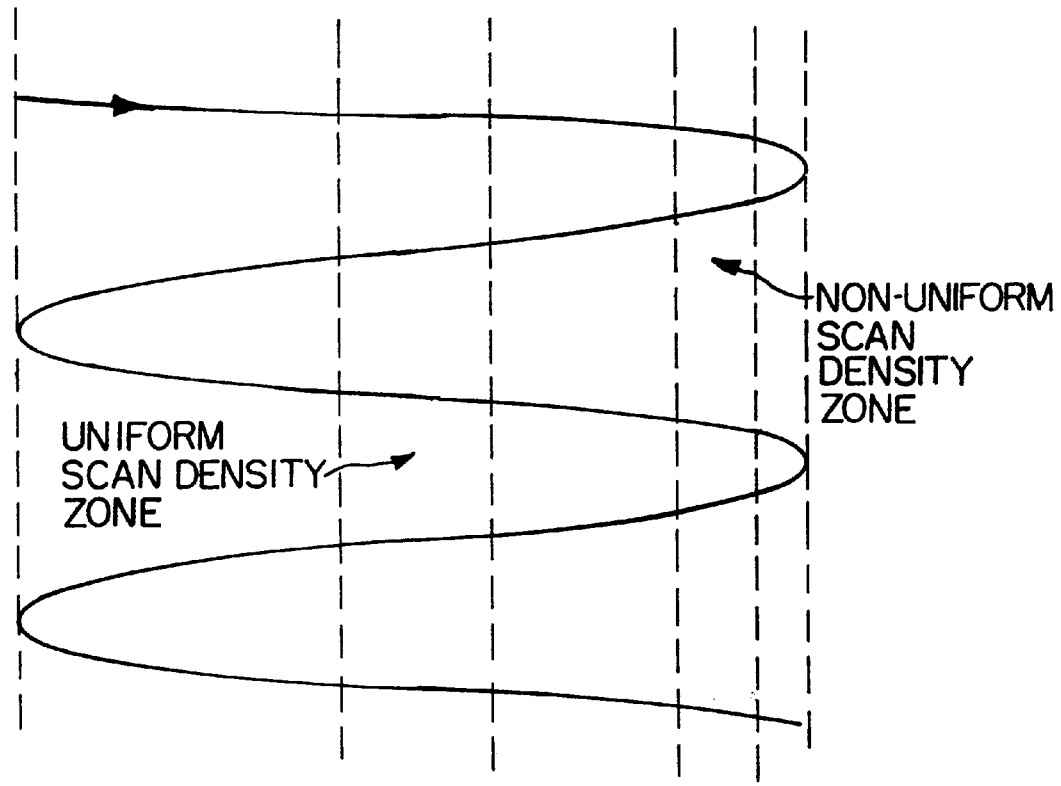
Figure 3C:
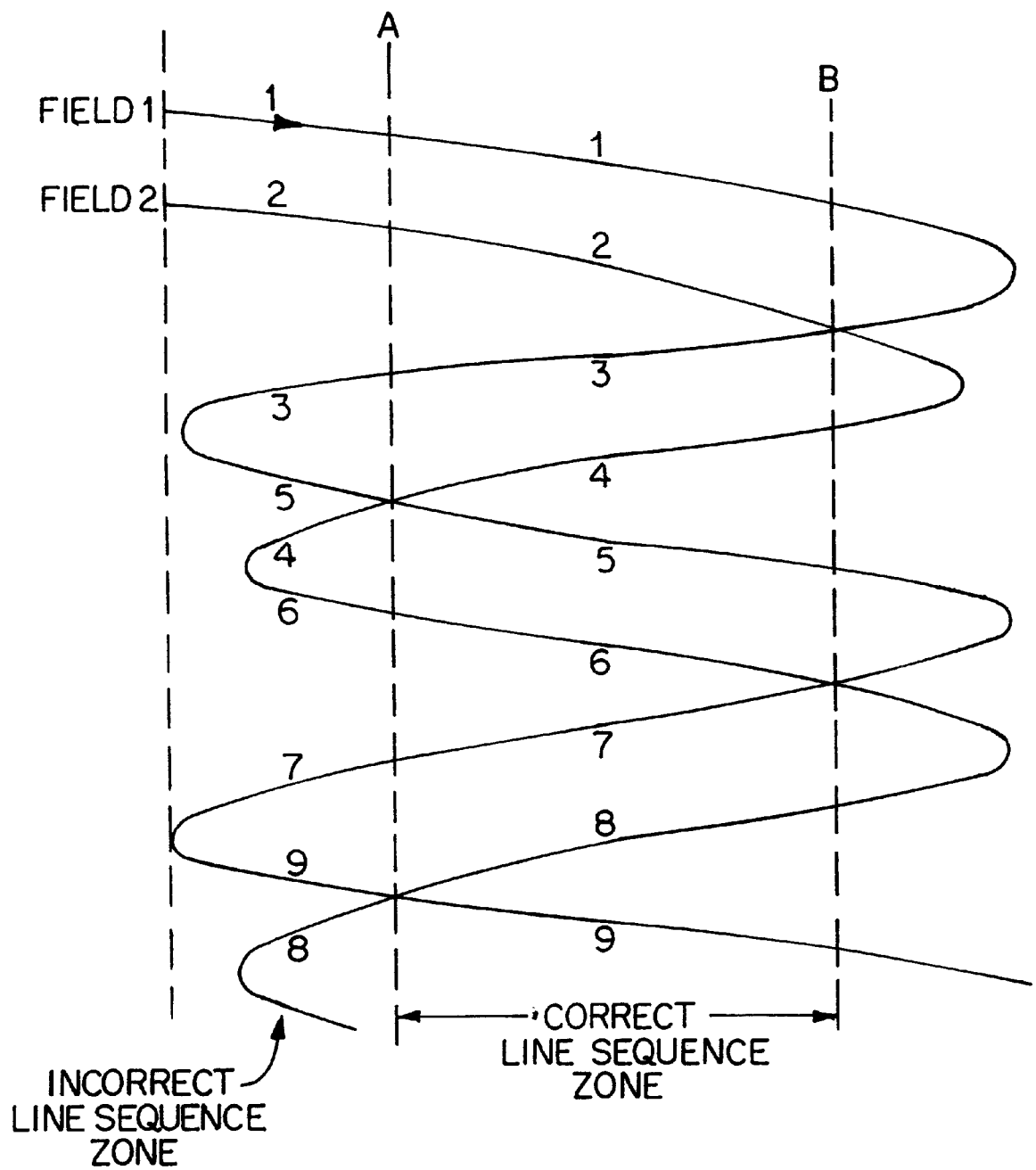
Figure 5A:
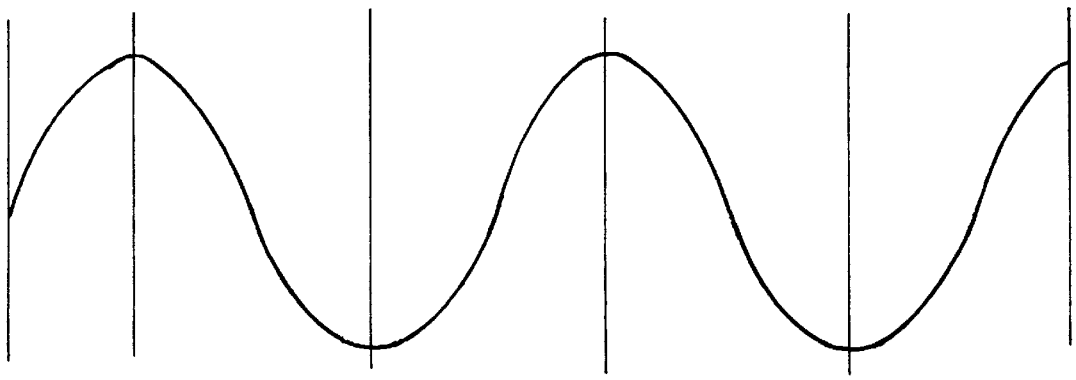
Figure 5B:
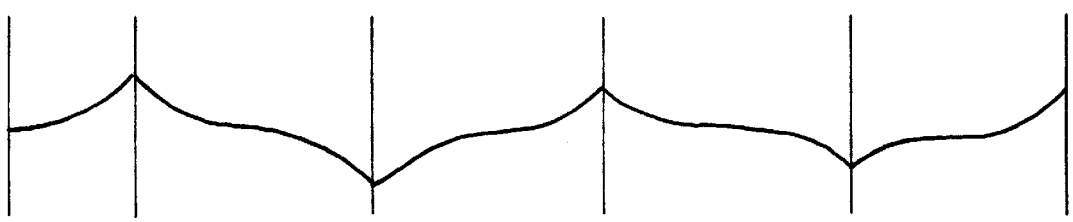
Figure 5C:
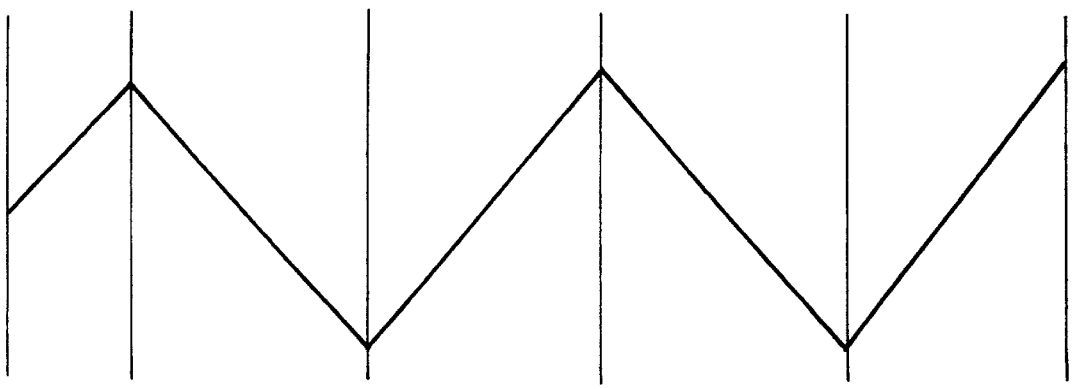

FIGS. 3A–C illustrate the problem of variable scan density and line sequencing over the field of view in a bi-directionai scanner imaging system;

FIGS. 4A–C illustrate the vertical sweep waveforms in a bi-directional scaner imaging system utilizing the present invention; and FIGS. 5A–C illustrate waveforms in a variable speed scanner imaging system utilizing the present invention.

Figure 2:
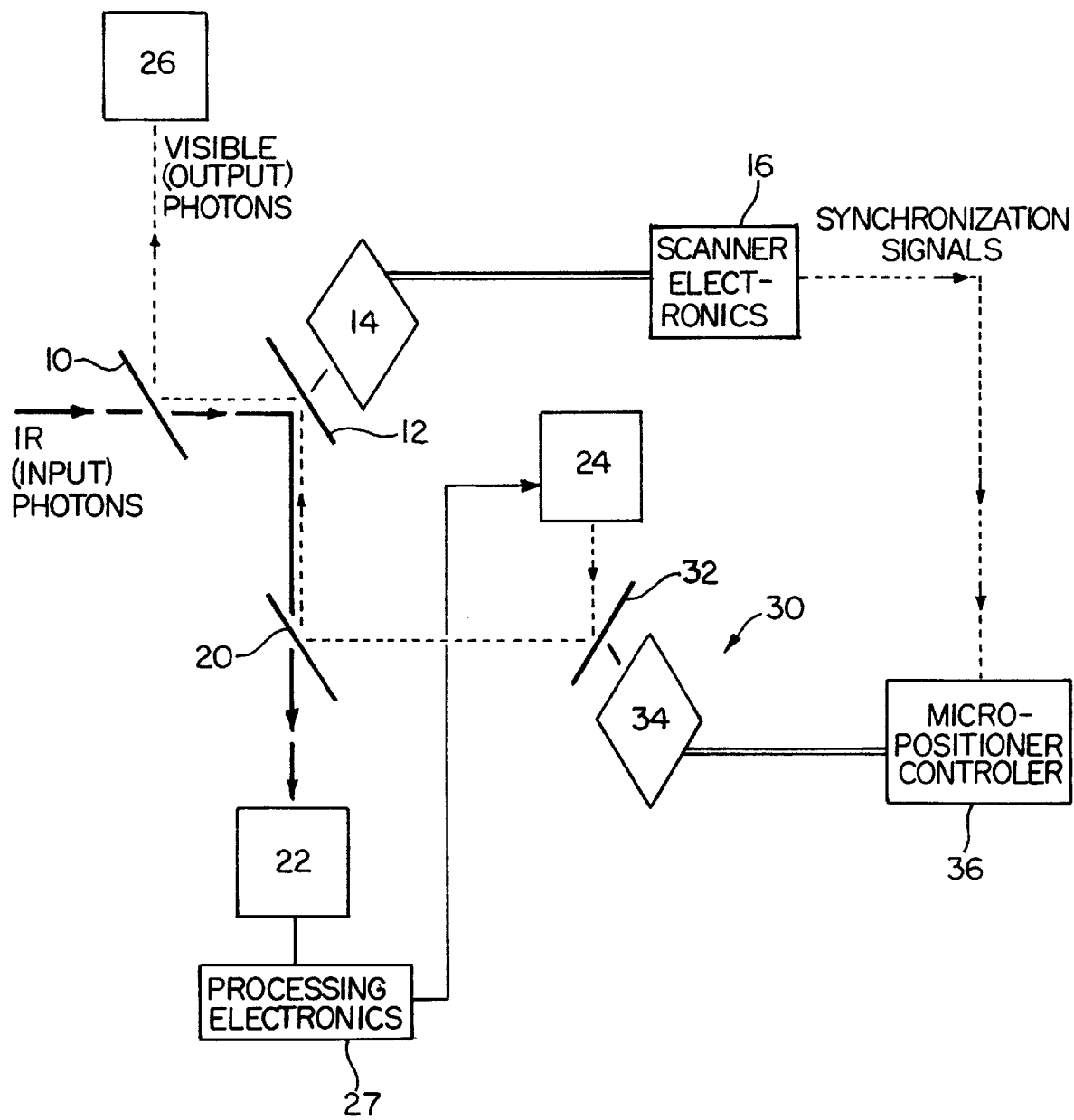
FIG. 2 is a schematic illustration of an infrared imaging system utilizing the present invention, and includes reference letters and numerals for the various parts of the scanner.

FIG. 2 is a block diagram description of an imaging system using an electromechanical scanner both for picture acquisition and display and incorporating a microscanner. It should be clearly understood that the invention disclosed herein can also be utilized in imaging systems having a display independent from but synchronized with the electromechanical scanner. In FIG. 2, the incoming flux of infrared radiation (IR) energy (photons) passes through a beamsplitter 10 and is scanned by the scanner mirror 12 which is moved by the scanner 14 actuators and motors. The scanner electronics 16 controls the operation of the scanner 14 and provides positional feedback information and synchronization signals.

The "scanned" output of the scanner 14 passes through the combiner 20 and is then focused and detected (converted to an electronic signal) by the detection assembly 22. It should be clearly understood that the beam splitter 10 and combiner 20 can be either reflective to visible light and transmittive to infrared radiation or vice versa. The configuration of the beam splitter 10 and combiner 20 depends on packaging and performance considerations. Also, the decision for each component (beam splitter 10 and combiner 20) can be independent of the choice for the other.

The output of the detection assembly 22 is amplified and processed in a video channel or channels (shown as processing electronics 27) and drives the LED module 24 to produce a time-modulated visible replica of the infrared radiation incoming signal. The photon flux generated by the LED module 24 is combined into the optical path of the infrared radiation signal (parallel and in opposite direction to each other) by the combiner 20. It is then deflected by the scanner mirror 12 which thus reconstructs the temporal modulation of visible photon flux into a dynamic spatially modulated visible image which is reflected by the beam splitter 10 into the display unit 26.

Most infrared radiation imaging systems require some additional optics (not shown in FIG. 2), usually an infrared radiation afocal and a visible afocal.

Two axis scanning mechanisms which use bi-directional scanners in one axis (usually horizontal) and a constant speed scanner in the other (vertical), exhibit variable scan density over the field of view. This phenomenon is due to the fact that the scanned lines are not straight and equally spaced as they should be to provide uniform scan efficiencies and/or brightness of the display over the whole field of view of the imaging system as shown in FIGS. 3A and B. FIG. 3B illustrates that the center zone of the field of view has a generally uniform scan density whereas the edges of the field of view have a clearly non-uniform scan density. In addition, for systems where interlacing is used, the lines of the different fields will cross at certain locations resulting into varying line sequences across the horizontal field of view. As it can be seen in FIG. 3C for a double interlaced system, the odd lines all belong to field 1 and the even ones to field 2 in the zone comprised between points A and B but this is no longer true in other areas of the field of view. This phenomenon is of no consequence for an imaging system wherein the acquisition and display functions are performed with the same electromechanical scanner, but has detrimental effects in systems where a display monitor independent from but synchronized with the scanner is used to display the image. In such systems, the line sequence will not be the same for the scanner and the display monitor results into line inversions in certain zones of the field of view.

The present invention corrects these problems by putting a microscanner 30 (micropositioner mirror 32 and micropositioner 34, micropositioner controller 36) disclosed above in FIG. 2 in the input photon signal and, if necessary, in the display photon signal, to deflect the optical signal(s) at the exact angular increment which nullifies the motion of the vertical scanner while each line is being swept. As it can be seen in FIGS. 4A–C, the resulting vertical sweep is a staircase as opposed to the linear sawtooth waveform and the swept lines are straight and parallel as in FIG. 3A.

Variable speed scanners (such as resonant or sinusoidal) may introduce undesirable effects in imaging systems, such as variable sensitivity and/or brightness in different regions of the field of view. In addition, in systems using time delay and integration techniques ("TDI") to combine the signal of several detectors, the variable scanning speed will impose the use of frequency modulated TDI clocks and possibly variable bandwidth video amplifiers to alleviate the associated fixed pattern noise. The present invention solves these problems by using the microscanner 30 to linearize the variable speed scanner one (FIG. 5C). This cascade scanner deflects the photon signal by an amount equal to the deviation from an ideal constant rate deflection. This correction can be applied on part of the field of view (FOV) if the range of the cascaded scanner does not allow full FOV correction. Typical scanning waveforms in a variable speed scanner imaging system utilizing the present invention are shown in FIGS. 5A–C.

What is claimed is:

1. An infrared imaging apparatus having a device which compensates for scanning nonlinearities and/or electronic delay comprising a micropositioner, an optical element operated by the micropositioner, and means for utilizing scanner positional feedback signals of the apparatus to control operation of the micropositioner, the imaging apparatus further including a scanner, a detector, a combiner that communicates a scanned image to the detector, and an LED module that is operatively driven by the detector and generates a photon flux that is combined into an infrared radiation path, wherein the device corrects the scanner to eliminate non-uniformities of scan density, to provide an improved image for the infrared imaging apparatus.

2. The apparatus and device in accordance with claim 1, wherein the photon flux is parallel and opposite in direction to the infrared radiation path.

3. The apparatus and device in accordance with claim 2, wherein the photon flux is deflected by a mirror of the scanner and then passes from a beam splitter to a display unit.

4. The apparatus and device in accordance with claim 3, wherein the photon flux is sent to the display unit by means of reflection.

5. An infrared imaging apparatus having a device which compensates for scanning nonlinearities and/or electronic delay comprising a micropositioner, an optical element operated by the micropositioner, and means for utilizing scanner positional feedback signals of the apparatus to control operation of the micropositioner, the imaging apparatus further including a scanner, a detector, a combiner that communicates a scanned image to the detector, and an LED module that is operatively driven by the detector and generates a photon flux that is combined into an infrared radiation path, wherein the device corrects the scanner to correct improper line sequencing, to provide an improved image for the infrared imaging apparatus.

6. The apparatus and device in accordance with claim 5, wherein the photon flux is parallel and opposite in direction to the infrared radiation path.

7. The apparatus and device in accordance with claim 6, wherein the photon flux is deflected by a mirror of the scanner and then passes from a beam splitter to a display unit.

8. The apparatus and device in accordance with claim 7, wherein the photon flux is sent to the display unit by means of reflection.

* * * * *